United States Patent
Dhaliwal et al.

(10) Patent No.: US 11,290,376 B2
(45) Date of Patent: *Mar. 29, 2022

(54) PRIORITIZED FORMATION OF BGP SESSIONS

(71) Applicant: Juniper Networks, Inc., Sunnyvale, CA (US)

(72) Inventors: Gurpreet Singh Dhaliwal, Indore (IN); Natarajan Chandrashekaran, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,998

(22) Filed: Nov. 23, 2020

(65) Prior Publication Data

US 2021/0075720 A1 Mar. 11, 2021

Related U.S. Application Data

(63) Continuation of application No. 15/888,940, filed on Feb. 5, 2018, now Pat. No. 10,862,798.

(51) Int. Cl.
*H04L 12/715* (2013.01)
*H04L 12/781* (2013.01)
(Continued)

(52) U.S. Cl.
CPC ............ *H04L 45/64* (2013.01); *H04L 12/66* (2013.01); *H04L 45/02* (2013.01); *H04L 45/52* (2013.01);
(Continued)

(58) Field of Classification Search
CPC ......... H04L 45/02; H04L 45/64; H04L 45/52; H04L 12/66; H04L 49/25
(Continued)

(56) References Cited

U.S. PATENT DOCUMENTS 7,508,829 B2   3/2009 Rangarajan et al.
7,778,248 B2 *  8/2010 Scudder ................. H04L 45/00
                                                          370/392
(Continued)

FOREIGN PATENT DOCUMENTS

CN    101855893 A    10/2010
CN    106027391 A    10/2016

OTHER PUBLICATIONS

Examination Report from counterpart European Application No. 18203788.7, dated Dec. 14, 2020, 10 pp.
(Continued)

*Primary Examiner* — Zi Ye
(74) *Attorney, Agent, or Firm* — Shumaker & Sieffert, P.A.

(57) ABSTRACT

A network device is described that includes one or more processors configured to select a prioritized sub-set of a plurality of routing protocol sessions based on peer priority information. The one or more processors are configured to establish one or more routing protocol sessions of the prioritized sub-set. The one or more processors are configured to, in response to determining that a threshold for establishing the prioritized sub-set of the plurality of routing protocol sessions is satisfied, establish one or more routing protocol sessions of the plurality of routing protocol sessions that are not included in the prioritized sub-set. The one or more processors are configured to forward network traffic using the established one or more routing protocol sessions of the prioritized sub-set and the established one or more routing protocol sessions of the plurality of routing protocol sessions that are not included in the prioritized sub-set.

20 Claims, 4 Drawing Sheets

(51) Int. Cl.
| | |
|---|---|
| *H04L 12/751* | (2013.01) |
| *H04L 12/66* | (2006.01) |
| *H04L 12/947* | (2013.01) |
| *H04L 29/08* | (2006.01) |
| *H04L 29/06* | (2006.01) |
| *H04L 45/64* | (2022.01) |
| *H04L 45/52* | (2022.01) |
| *H04L 45/02* | (2022.01) |
| *H04L 49/25* | (2022.01) |
| *H04L 67/104* | (2022.01) |
| *H04L 67/14* | (2022.01) |
| *H04L 69/18* | (2022.01) |
| *H04L 69/24* | (2022.01) |

(52) U.S. Cl.
CPC .......... *H04L 49/25* (2013.01); *H04L 67/104* (2013.01); *H04L 67/14* (2013.01); *H04L 69/18* (2013.01); *H04L 69/24* (2013.01)

(58) Field of Classification Search
USPC ....................................................... 709/240
See application file for complete search history.

(56) References Cited

U.S. PATENT DOCUMENTS

| | | | |
|---|---|---|---|
| 8,327,002 | B1 | 12/2012 | Van Dussen et al. |
| 10,862,798 | B2 | 12/2020 | Dhaliwal et al. |
| 2003/0112269 | A1 | 6/2003 | Lentz et al. |
| 2004/0081154 | A1 | 4/2004 | Kouvelas |
| 2006/0133390 | A1* | 6/2006 | Sreekantiah ............ H04L 45/02 370/401 |
| 2009/0122701 | A1 | 5/2009 | Goldman et al. |
| 2014/0040483 | A1* | 2/2014 | Van Dussen ............ G06F 15/16 709/227 |
| 2016/0294684 | A1 | 10/2016 | Vairavakkalai et al. |

OTHER PUBLICATIONS

First Office Action and Search Report, and translation thereof, from counterpart Chinese Application No. 201811277551.7, dated Jan. 25, 2021, 20 pp.

Response to Examination Report dated Dec. 14, 2020 from counterpart European Application No. 18203788.7, filed Apr. 13, 2021, 10 pp.

Rekhter et al., "A Border Gateway Protocol 4 (BGP-4)," RFC 4271, Network Working Group, Jan. 2006, 104 pp.

Extended Search Report from counterpart European Application No. 18203788.7, dated May 9, 2019, 9 pp.

Sai Mohit Muddu, Puredata Systems for Analytics: Concurrency and Workload Management, St. Cloud State University, https://repository.stcloudstate.edu/msia_etds/3 (Year: 2015).

Response to Extended Search Report from counterpart European Application No. 18203788.7, filed Feb. 7, 2020, 11 pp.

Miguel Barreiros, QOS-Enabled Networks Tools and Foundations, 2011, Wiley, ISBN: 9780470686973, p. 131 (Year: 2011).

Examination Report from counterpart European Application No. 18203788.7, dated Mar. 26, 2020, 7 pp.

Response to Examination Report dated Mar. 26, 2020 from counterpart European Application No. 18203788.7, filed Jul. 23, 2020, 7 pp.

Prosecution History from U.S. Appl. No. 15/888,940, dated Jan. 8, 2020 through Aug. 12, 2020, 76 pp.

Second Office Action and Search Report, and translation thereof, from counterpart Chinese Application No. 201811277551.7, dated Jul. 14, 2021, 13 pp.

Notice of Intent to Grant and Text Intended to Grant from counterpart European Application No. 18203788.7, dated Sep. 17, 2021, 32 pp.

Decision on Rejection, and translation thereof, from counterpart Chinese Application No. 201811277551.7 dated Nov. 16, 2021, 11 pp.

* cited by examiner

PRIORITIZED FORMATION OF BGP SESSIONS

This application is a continuation of U.S. application Ser. No. 15/888,940 filed Feb. 5, 2018, the entire content of which is herein incorporated by reference.

TECHNICAL FIELD

This disclosure generally relates to computer networks and, more specifically, to network routing protocol sessions.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes for the network. In general, a route indicates reachability information for a network prefix. From the routing information, the routers may generate forwarding information, which is used by the routers to relay packet flows through the network and, more particularly, to relay the packet flows to a next hop. In reference to forwarding a packet, the "next hop" from a network router typically refers to a downstream neighboring device for a given route. Upon receiving an incoming packet, the router examines information within the packet to identify the destination for the packet. Based on the destination, the router forwards the packet in accordance with the forwarding information.

Some computer networks, such as the Internet, an administrative domain or network, often include many routers that exchange routing information according to a defined routing protocol. Examples of the defined routing protocol may include, among others, the Border Gateway Protocol (BGP), the Intermediate System to Intermediate System (IS-IS) Protocol, and the Open Shortest Path First (OSPF) Protocol. When two routers initially connect, the routers exchange routing information and generate forwarding information from the exchanged routing information. Particularly, the two routers initiate a routing protocol communication "session" via which they exchange routing information using routing protocol messages according to the defined routing protocol. The routers continue to communicate via the routing protocol session to incrementally update the routing information and, in turn, update their forwarding information in accordance with changes to a topology of the network indicated in the updated routing information. For example, the routers may send update messages to advertise newly available routes or to inform that some routes are no longer available.

A computer network using a routing protocol, such as BGP, for example, directs data packets between network nodes based on addressing information with the data packets. A route advertisement message, such as a BGP UPDATE message, advertises one or more routes for network prefixes reachable via the network. A routing domain, such as a BGP network, may include one or more routers, route reflectors, nodes, and endpoint devices (e.g., servers, printers, and computers). Some of the routers within the routing domain may be grouped together into redundant clusters. Each router within the routing domain typically forwards packets according to routes stored at the router and the destination address of the data packets. Route reflectors, such as BGP route reflectors, peer with other routers to receive and advertise routes but typically do not forward packets according to the routes.

SUMMARY

In general, this disclosure describes techniques for prioritizing formation of routing protocol sessions. For example, the disclosure describes techniques that may allow a network device to, based on configured priority information, first establish a first routing protocol session that may take a relatively long time to establish, e.g., for a routing protocol session with a wide-area network (WAN) cloud, before establishing a second routing protocol session that may take a relatively short time to establish, e.g., for a routing protocol session with top-of-rack router (TOR). This may be useful in cases where a network device may receive traffic on the second routing protocol session that the network device may then need to send out on the first routing protocol session. If the first routing protocol session is not established before the second routing protocol session, the network device may drop the received traffic while the network device is still establishing the first routing protocol session, potentially resulting in service disruption to end users. The techniques of this disclosure also allow a user to configure a priority set to specify how a network device prioritizes routing protocol sessions. The routing protocol session may be a Border Gateway Protocol (BGP) session, for example.

In some examples, a method includes selecting, by a network device, a prioritized sub-set of a plurality of routing protocol sessions based on peer priority information. Each routing protocol session of the plurality of routing protocol sessions corresponds to a session with a respective peer network device of a plurality of peer network devices. The peer priority information indicates a priority level of the routing protocol session. The method further includes establishing, by the network device, one or more routing protocol sessions of the prioritized sub-set. Establishing the one or more routing protocol sessions of the prioritized sub-set comprises refraining from establishing one or more routing protocol sessions of the plurality of routing protocol sessions that are not included in the prioritized sub-set. The method further includes, in response to determining that a threshold for establishing the prioritized sub-set of the plurality of routing protocol sessions is satisfied, establishing, by the network device, one or more routing protocol sessions of the plurality of routing protocol sessions that are not included in the prioritized sub-set. The method further includes forwarding, by the network device, network traffic using the established one or more routing protocol sessions of the prioritized sub-set and the established one or more routing protocol sessions of the plurality of routing protocol sessions that are not included in the prioritized sub-set.

In some examples, a network device includes one or more processors implemented in circuitry. The one or more processors are configured to select a prioritized sub-set of a plurality of routing protocol sessions based on peer priority information. Each routing protocol session of the plurality of routing protocol sessions corresponds to a session with a respective peer network device of a plurality of peer network devices. The peer priority information indicates a priority level of the routing protocol session. The one or more processors are configured to establish one or more routing protocol sessions of the prioritized sub-set. Establishing the one or more routing protocol sessions of the prioritized sub-set comprises refraining from establishing one or more routing protocol sessions of the plurality of routing protocol sessions that are not included in the prioritized sub-set. The one or more processors are configured to, in response to determining that a threshold for establishing the prioritized sub-set of the plurality of routing protocol sessions is satisfied, establish one or more routing protocol sessions of the plurality of routing protocol sessions that are not included in the prioritized sub-set. The one or more processors are configured to forward network traffic using the established one or more routing protocol sessions of the prioritized sub-set and the established one or more routing protocol sessions of the plurality of routing protocol sessions that are not included in the prioritized sub-set.

In some examples, computer-readable storage medium comprises instructions for causing a programmable processor to select a prioritized sub-set of a plurality of routing protocol sessions based on peer priority information. Each routing protocol session of the plurality of routing protocol sessions corresponding to a session with a respective peer network device of a plurality of peer network devices. The peer priority information indicates a priority level of the routing protocol session. The instructions further cause the programmable processor to establish one or more routing protocol sessions of the prioritized sub-set. Establishing the one or more routing protocol sessions of the prioritized sub-set comprises refraining from establishing one or more routing protocol sessions of the plurality of routing protocol sessions that are not included in the prioritized sub-set. The instructions further cause the programmable processor to, in response to determining that a threshold for establishing the prioritized sub-set of the plurality of routing protocol sessions is satisfied, establish one or more routing protocol sessions of the plurality of routing protocol sessions that are not included in the prioritized sub-set. The instructions further cause the programmable processor to forward network traffic using the established one or more routing protocol sessions of the prioritized sub-set and the established one or more routing protocol sessions of the plurality of routing protocol sessions that are not included in the prioritized sub-set.

In some examples, a device includes means for selecting a prioritized sub-set of a plurality of routing protocol sessions based on peer priority information. Each routing protocol session of the plurality of routing protocol sessions corresponds to a session with a respective peer network device of a plurality of peer network devices. The peer priority information indicates a priority level of the routing protocol session. The device further includes means for establishing one or more routing protocol sessions of the prioritized sub-set. Establishing the one or more routing protocol sessions of the prioritized sub-set comprises refraining from establishing one or more routing protocol sessions of the plurality of routing protocol sessions that are not included in the prioritized sub-set. The device further includes means for, in response to determining that a threshold for establishing the prioritized sub-set of the plurality of routing protocol sessions is satisfied, establishing one or more routing protocol sessions of the plurality of routing protocol sessions that are not included in the prioritized sub-set. The device further includes means for forwarding network traffic using the established one or more routing protocol sessions of the prioritized sub-set and the established one or more routing protocol sessions of the plurality of routing protocol sessions that are not included in the prioritized sub-set.

The details of one or more examples are set forth in the accompanying drawings and the description below. Other features, objects, and advantages will be apparent from the description and drawings, and from the claims.

DETAILED DESCRIPTION

Figure 1:
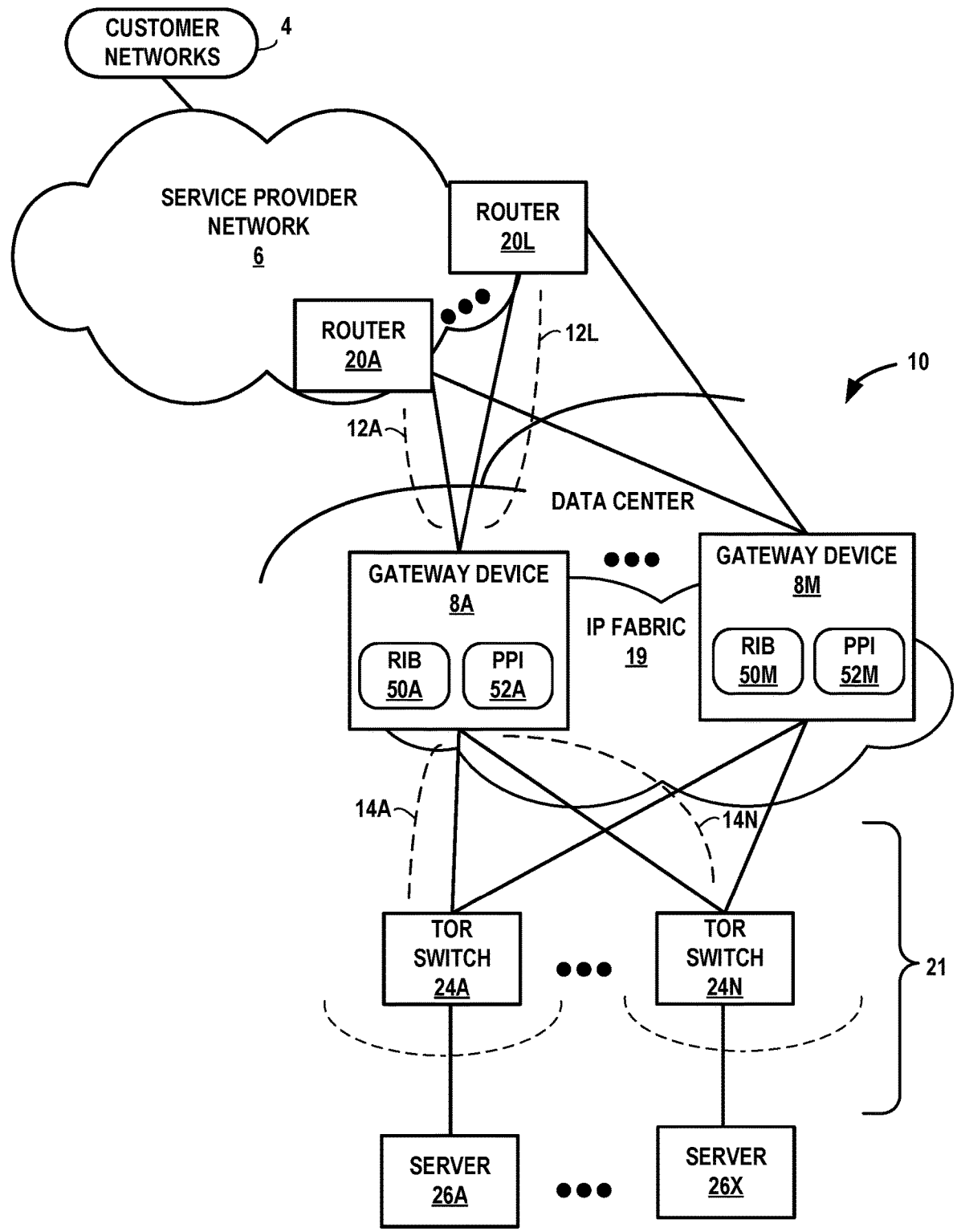
FIG. 1 is a block diagram illustrating an example network having a network device in which examples of the techniques described herein may be implemented.

FIG. 1 is a block diagram illustrating an example network having a network device in which examples of the techniques described herein may be implemented. In general, data center 10 provides an operating environment for applications and services for customer networks 4 coupled to the data center 10 by service provider network 6. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customer networks 4. Customers networks 4 may be collective entities such as enterprises and governments or individuals. For example, a network data center may host web services for several enterprises and end users. Other example services may include data storage, virtual private networks, traffic engineering, file service, data mining, scientific- or supercomputing, and so on. In some examples, data center 10 is an individual network server, a network peer, or otherwise.

Service provider network 6 includes routers 20A-20L (collectively, "routers 20"). In some examples, routers 20 may be provider edge (PE) routers. Although not shown, service provider network 6 may include network devices other than routers 20, such as, for example, but not limited to, switches, servers, route reflectors, or other network devices.

In this example, data center 10 includes a set of storage systems and application servers interconnected via high-speed switch fabric 21 provided by one or more tiers of physical network switches and routers. Servers 26A-26X (collectively, "servers 26") function as compute nodes of the data center. In some examples, the terms "compute nodes" and "servers" are used interchangeably herein to refer to servers 26. For example, each of servers 26 may provide an operating environment for execution of one or more customer-specific virtual machines.

Switch fabric 21 is provided by a set of interconnected top-of-rack (TOR) switches 24A-24N (collectively, "TOR switches 24") coupled to servers 26. Although not shown, data center 10 may also include, for example, one or more chassis switches, non-edge switches, routers, hubs, gateway devices, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

TOR switches 24 provide servers 26 with redundant (multi-homed) connectivity to routers 20 of IP fabric 19. TOR switches 24 are network devices that provide layer two (e.g., MAC) and/or layer 3 (e.g., IP) routing and/or switching functionality. For example, each TOR switches 24 and gateway devices 8 may be configured to establish multiple routes using a routing protocol session. TOR switches 24 each include one or more processors and a memory, and that are capable of executing one or more software processes. Gateway devices 8A-8M (collectively, "gateway devices 8") act to forward and receive packets between IP fabric 20 and service provider network 6. In some examples, gateway devices 8 may be BGP gateway devices.

Gateway devices 8 may be configured to establish a routing protocol session. As used herein, a routing protocol session may refer to, for example, but not limited to, a BGP, or another routing protocol session. Details of BGP may be found at, for example, the Internet Engineering Task Force (IETF) RFC 4271, "A Border Gateway Protocol 4 (BGP-4)," the entirety of which is incorporated herein by reference. For example, gateway devices 8 may be configured to exchange Internet routes with peer network devices. As used herein, a peer network device may refer to network devices of service provider network 6 (e.g., routers 20), gateway devices 8, TOR switches 24, and other peer network devices.

More specifically, for example, gateway devices 8 may create a TCP connection with peer network devices. For instance, gateway devices 8 may create a TCP connection with routers 20 and/or TOR switches 24. After the TCP connection has been established, gateway devices 8 may attempt to create a routing protocol session by the output an open routing protocol message. For example, gateway device 8A may output a BGP open message that indicates a BGP version, autonomous systems (AS) number, hold time, and BGP identifier with router 20A. In response to receiving a confirmation message from a particular peer network device, gateway devices 8 may determine that a routing protocol session has been established with the particular peer device. For instance, in response to receiving a BGP keep alive message from router 20A, gateway devices 8 may determine that a BGP session has been established with router 20A.

In the example of FIG. 1, gateway device 8A may work to establish routing protocol session 12A with router 20A, routing protocol session 12L with router 20L, routing protocol session 14A with TOR switch 24A, and routing protocol session 14N with TOR switch 24N. Although not shown, gateway device 8A may work to establish routing protocol sessions with routers 20B-20M, and TOR switches 24B-24M. Similarly, each one of gateway devices 8B-8M may work to establish routing protocol session with routers 20 and TOR switches 24 (not shown).

Gateway devices 8 may receive advertised routes (e.g., a unit of information that pairs a set of destinations with attributes of a path to those destinations) in a route advertisement messages (e.g., BGP update messages) output by routers 20. Similarly, gateway devices 8 may receive advertised routes in a route advertisement messages (e.g., BGP update messages) output by TOR switches 24. Gateway devices 8 may store the advertised routes in a routing information bases (RIBs) 50A-50M (collectively, "routing information bases 50" or "RIBs 50"). In response to processing all advertised routes of a routing protocol session, gateway devices 8 may determine that a routing protocol session has finished route exchanges. For instance, gateway device 8A may determine that routing protocol session 12A has finished route exchanges when all advertised routes in a route advertisement message for routing protocol session 12A have been stored in RIB 50A.

Gateway devices 8 may each be speakers for implementing a routing protocol session. For instance, gateway devices 8 may advertise routes to TOR switches 24 and/or to routers 20. Peer network devices can use information received in advertisement messages to construct a graph that describes the relationships of the various autonomous systems of which the peer network devices are members. For instance, TOR switch 24A may construct a graph that describes the relationships of the various autonomous systems using advertisement messages output by gateway devices 8. However, as discussed further, for instance, gateway device 8A may advertise a "default route" to TOR switch 24A when gateway device 8A has not yet received advertised routes from routers 20. The default route may be represented by the network prefix 0.0.0.0/0. As such, TOR switches 24 may construct a graph that describes the relationships of the various autonomous systems using a default route, which may result dropped traffic (e.g., black holing).

Although techniques of this disclosure are described primarily with respect to BGP, the techniques are similarly applicable to processing routing information received in routing protocol messages according to other layer 3 routing protocols, as well as interior gateway protocols in which route resolution is required, such as any distance-vector protocol (e.g., RIP).

In some systems, traffic between any two network devices, such as between network devices within IP fabric 20 (not shown) or between servers 26 and customer networks 4 or between servers 26, for example, may traverse the physical network using many different paths. For example, there may be several different paths of equal cost between two network devices. A "flow" can be defined by the five values used in a header of a packet, or "five-tuple," e.g., a protocol, source internet protocol (IP) address, destination IP address, source port, and destination port that are used to route packets through the physical network. For example, the protocol may specify the communications protocol, such as TCP or UDP, and source port and destination port may refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a virtual local area network (VLAN) tag, transport layer information, a multiprotocol label switching (MPLS) or generalized MPLS (GMPLS) label, and an ingress port of a network device receiving the flow. For example, a flow may be all PDUs transmitted in a transmission control protocol (TCP) connection, all PDUs sourced by a particular MAC address or IP address, all PDUs having the same VLAN tag, or all PDUs received at the same switch port.

In some network designs (e.g., in data center 10) where multiple gateway devices (e.g., gateway devices 8) are used for wide-area network (WAN) connectivity and traffic load balancing, traffic outages may occur when routing protocol sessions (e.g., BGP sessions) are established at different intervals in an arbitrary order when a gateway comes online after a failure. For example, gateway devices 8 may advertise aggregated routes and/or default routes in the internal network (e.g., high-speed switch fabric 21). In this example, if gateway devices 8 advertise an aggregated route or default route in the internal network, outages may occur at servers 26 because of routing protocol sessions establishing at different intervals in no particular order when one of gateway devices 8 comes online after the failure.

More specifically, for example, gateway device 8A may establish routing protocol sessions 14A-14N with TOR switches 24 and begin to receive traffic to be forwarded to routers 20. However, in this example, gateway device 8A may be unable to forward traffic from TOR switches 24 to routers 20 because gateway device 8A may not have established routing protocol sessions 12A-12L with the WAN (e.g., routers 20). As such, in this example, gateway device 8A may drop traffic (e.g., black holed traffic) received from TOR switches 24 and destined for the WAN (e.g., routers 20) until gateway device 8A has established at least one of routing protocol sessions 12A-12L with the WAN (e.g., routers 20). Moreover, in some examples, TOR switches 24 may have directed the network traffic to gateways 8B-8M, which may have already established at least one of routing protocol sessions with the WAN, and thus would have been able to forward traffic from TOR switches 24 to routers 20. The above problems are explained with reference to a layer 3 (L3) data center example, where L3VPN is used for overlay.

WAN connectivity may be achieved using connections between the TOR switches 24 to multiple gateway devices 8. Gateway devices 8 may connect to the WAN cloud (e.g., routers 20) and store the entire Internet route table. In this example, gateway devices 8 may provide an aggregated route or default route to TOR switches 24 in order to reach the outside world (e.g., service provider network 6, customer networks 4, etc.). TOR switches 24 may connect to multiple gateway devices 8 in order to load balance and provide redundancy. During an event of a failure of a gateway (e.g., gateway device 8A) or the connectivity between the gateway and TOR switches 24, TOR switches 24 may continue to forward traffic via the other gateway (e.g., gateway 8L). However, when the failed gateway comes back online, some gateway devices may establish routing protocol session with TOR switches 24 and the WAN cloud in any order. In instances where the routing protocol session establishment with TOR switches 24 has finished and routing protocol sessions establishment with service provider network 6 has not yet finished, such gateway devices may advertise a default route to TOR switches 24 before learning of Internet route table (e.g., finishing establishing routing protocol session establishment), leading to drop of traffic (e.g., black hole).

To address one or more of the above problems, gateway devices 8 may be configured to use peer priority information 52A-52M (collectively, "peer priority information 52" or "PPI 52"). Gateway devices 8 may receive peer configuration information defining priority information 52 via a management interface (e.g., command line interface). For example, gateway device 8A may be configured to use peer priority information 52A to determine a user configurable priority level set for all neighbors configured for a routing protocol session (e.g., BGP session). In this way, gateway device 8A may be configured to prioritize an establishment of routing protocol sessions 12A-12L and 14A-14N such that gateway device 8A establishes routing protocol sessions 12A-12L with service provider network 6 prior to establishing routing protocol sessions 14A-14N with TOR switches 24, which may help to reduce or eliminate dropped traffic when gateway device 8A comes back online after a failure.

In accordance with one or more techniques described herein, gateway device 8A may be configured to select a prioritized sub-set of routing protocol sessions based on peer priority information 52A. For example, gateway device 8A may arrange all neighbors or peer network devices with different priorities into two priority levels, for example, but not limited to, a high priority level and a low priority level.

For example, peer priority information 52A may indicates that routing protocol sessions between gateway device 8A and a network device reachable via a wide-area network (e.g., routers 20) corresponds to the high priority. For instance, gateway device 8A may determine that peer priority information 52A indicates routing protocol sessions 12A-12L correspond to the high priority. In this example, peer priority information 52A may indicate that routing protocol sessions 14A-14N between gateway device 8A and TOR switches 24 does not correspond to the high priority (e.g., are low priority).

Gateway device 8A may establish one or more routing protocol sessions of the prioritized sub-set. In some examples, routing protocol sessions may refer to BGP sessions. For example, when a routing protocol process (e.g., BGP protocol process) is started, gateway device 8A may begin to establish routing protocol sessions corresponding to the high priority level and may defer processing routing protocol sessions corresponding to the low priority level. More specifically, for instance, gateway device 8A may output an open routing protocol message (e.g., BGP open message) to each of routers 20 for establishing routing protocol sessions 12A-12L and may refrain from outputting open routing protocol messages to TOR switches 24 for establishing routing protocol sessions 14A-14N.

In response to determining that a threshold for establishing the prioritized sub-set of routing protocol sessions is not satisfied, gateway device 8A may refrain from establishing routing protocol sessions that are not included in the prioritized sub-set. For example, gateway device 8A may continue to establish routing protocol sessions corresponding to the high priority level (e.g., routing protocol sessions 12A-12L) and may defer processing routing protocol sessions corresponding to the low priority level (e.g., routing protocol sessions 14A-14N) until one or more of the following.

Gateway devices 8 may process routing protocol sessions that are not included in the prioritized sub-set (e.g., routing protocol sessions 14A-14N) when a configurable number (e.g., 'N') of routing protocol sessions that are included in the prioritized sub-set have been established. More specifically, for example, gateway device 8A may determine whether the threshold for establishing the prioritized sub-set of the plurality of routing protocol sessions is satisfied based on determining whether a number of established routing protocol sessions of the prioritized sub-set exceeds a threshold number of established routing protocol sessions. For instance, gateway device 8A may determine that a threshold for establishing routing protocol sessions 12A-12L is satisfied when a number of established routing protocol sessions 12A-12L exceeds 'N'. The threshold number of established routing protocol sessions (e.g., 'N') may be entered into a management interface (e.g., user interface, command line interface, etc.). In this example, in response to determining that the threshold for establishing the prioritized sub-set of the plurality of routing protocol sessions is satisfied, gateway device 8A may establish one or more routing protocol sessions of the plurality of routing protocol sessions that are not included in the prioritized sub-set. For instance, in response to determining that at least 'N' number of routing protocol sessions 12A-12L are established, gateway device 8A may establish routing protocol sessions 14A-14N.

Additionally, or alternatively, gateway devices 8 may process routing protocol sessions that are not included in the prioritized sub-set when a configurable timer expires post 'N' sessions of routing protocol sessions corresponding to the high priority level have been established. For example, gateway device 8A may initiate a timer when a number of established routing protocol sessions that are included in the prioritized sub-set exceeds a threshold number of established routing protocol sessions. For instance, gateway device 8A may initiate (e.g., start) the timer when a number of established routing protocol sessions 12A-12L exceeds 'N'. In this example, gateway device 8A may determine that the threshold for establishing the routing protocol sessions that are included in the prioritized sub-set is satisfied when the timer exceeds a threshold timer value. The threshold timer value may be entered into a management interface (e.g., user interface, command line interface, etc.). For instance, after the timer expires, gateway device 8A may establish routing protocol sessions 14A-14N.

Additionally, or alternatively, gateway devices 8 may process routing protocol sessions that are not included in the prioritized sub-set when a configurable number (e.g., T) of routing protocol sessions that are included in the prioritized sub-set have finished route exchanges. For example, gateway device 8A may determine that a threshold for establishing the routing protocol sessions corresponding to the high priority level is satisfied when a number of finished route exchanges corresponding to the high priority level exceeds 'T' number of finished route exchanges. The threshold number of finished routing exchanges (e.g., 'T') may be entered into a management interface (e.g., user interface, command line interface, etc.). For instance, gateway device 8A may determine that the threshold for establishing routing protocol sessions 12A-12L is satisfied when a number of finished route exchanges for routing protocol sessions 12A-12L exceeds 'T'. In this example, in response to determining that the threshold for establishing the prioritized sub-set of the plurality of routing protocol sessions is satisfied, gateway device 8A may establish one or more routing protocol sessions of the plurality of routing protocol sessions that are not included in the prioritized sub-set. For instance, in response to determining that at least 'T' number of route exchanges for routing protocol sessions 12A-12L are finished, gateway device 8A may establish routing protocol sessions 14A-14N.

In some examples, if none or less than 'N' number of the routing protocol sessions corresponding to the high priority level have been established, gateway devices 8 may refrain from processing the routing protocol sessions corresponding to the low priority level. However, gateway devices 8 may be configured to override refraining from processing the routing protocol sessions corresponding to the low priority level. For instance, if none or less than 'N' number of the sessions corresponding to the high priority level have been established, gateway devices 8 may begin processing the routing protocol sessions corresponding to the low priority level. Said differently, in response to determining that a threshold for establishing the prioritized sub-set of routing protocol sessions is satisfied (e.g., satisfies threshold 'T', threshold 'N', a timer, or another threshold), gateway device 8A may establish routing protocol sessions that are not included in the prioritized sub-set.

Gateway devices 8 may forward network traffic using the established routing protocol sessions. For example, TOR switch 24A may output traffic from server 26A to customer networks 4 using a route advertised by gateway device 8A. Although the above example described gateway device 8A as performing one or more steps, other network devices may perform the steps of gateway device 8A. Although the above example lists two priority levels, (e.g., high and low), gateway devices 8 may be configured to use more than two levels, for instance, but not limited to, high priority level, medium priority level, and low priority level, or other priority levels.

Figure 2:
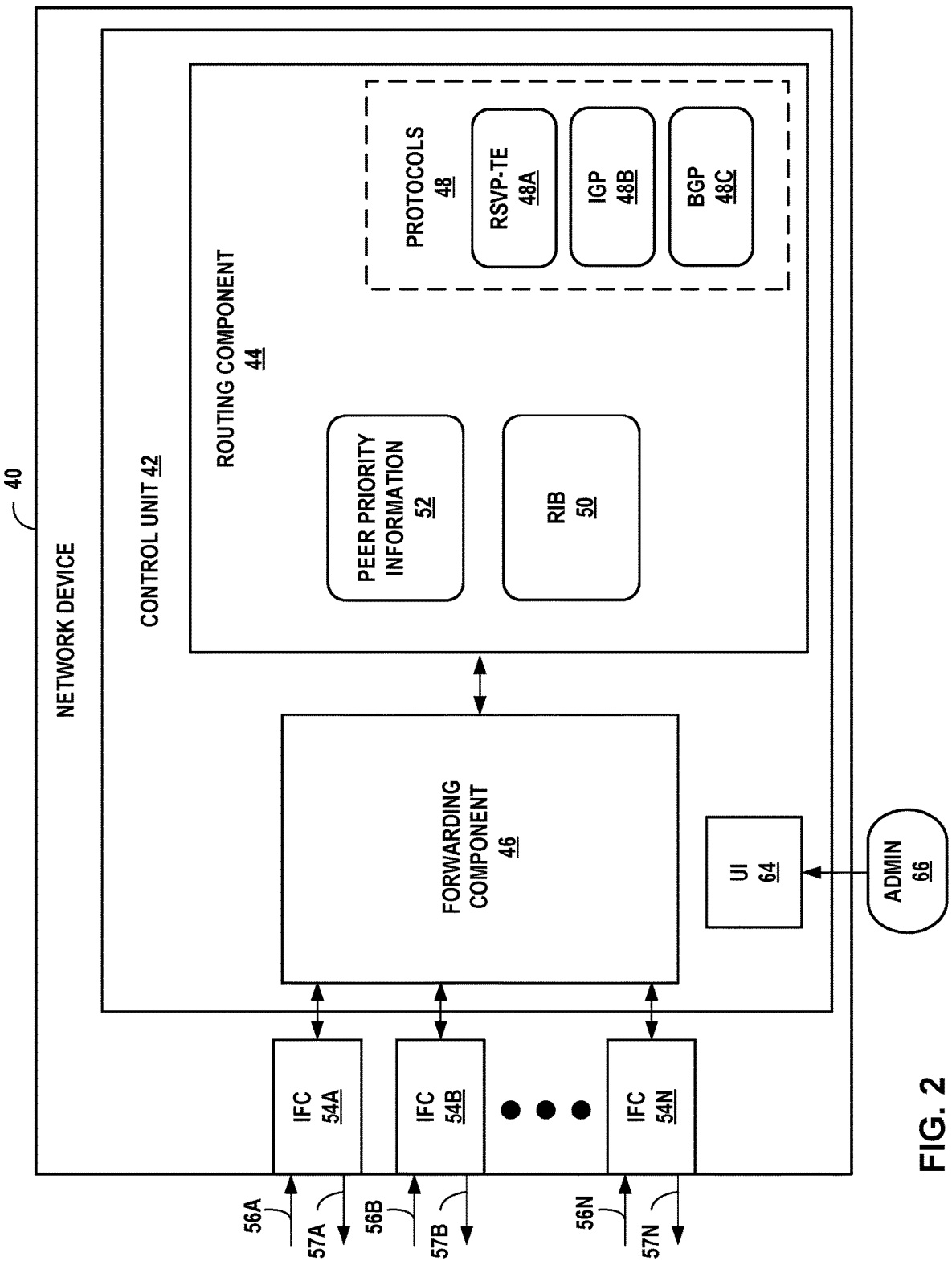
FIG. 2 is a block diagram illustrating an example implementation of a network device of FIG. 1 in further detail.

FIG. 2 is a block diagram illustrating an example implementation of a network device of FIG. 1 in further detail. Network device 40 may correspond to any of gateway devices 8 of FIG. 1 that provides access to data center 10. Network device 40 includes interface cards 54A-54N (collectively, IFCs 54) for receiving packets via input links 56A-56N (collectively, input links 56) and sending packets via output links 57A-57N (collectively, output links 57). IFCs 54 are interconnected by a high-speed switch (not shown) and links 56, 57. In one example, network device 40 comprises switch fabric, switchgear, a configurable network switch or hub, and the like. Links 56, 57 comprise any form of communication path, such as electrical paths within an integrated circuit, external data busses, optical links, network connections, wireless connections, or other type of communication path. IFCs 54 are coupled to input links 56 and output links 57 via a number of interface ports (not shown).

When network device 40 receives a packet via one of input links 56, control unit 42 determines via which of output links 57 to send the packet. Control unit 42 includes routing component 44 and forwarding component 46. Routing component 44 determines one or more routes through a network, e.g., through interconnected devices such as other routers. Control unit 42 provides an operating environment for protocols 48, which are typically implemented as executable software instructions. As illustrated, protocols 48 may include RSVP-TE 48A, interior gateway protocol (IGP) 48B, and BGP 48C. Examples of IGP 48B may include, but are not limited to, the Intermediate System-Intermediate System (ISIS) or the Open Shortest Path First (OSPF) protocol. Network device 40 uses RSVP-TE 48A to set up LSPs. As described herein, RSVP-TE 48A is programmatically extended to allow for a varying per-hop bandwidth constraint. Protocols 48 may include other routing protocols in addition to or instead of RSVP-TE 48A and LDP 46B, such as other Multi-protocol Label Switching (MPLS) protocols; or routing protocols, such as the OSPF, routing information protocol (RIP), interior routing protocols, or other network protocols.

By executing the routing protocols, routing component 44 identifies existing routes through the network and determines new routes through the network. Routing component 44 stores routing information in a routing information base (RIB) 50 that includes, for example, known routes through the network. Forwarding component 46 stores forwarding information that includes destinations of output links 57.

Network device 40 may be configured to use peer priority information 52 to determine a user configurable priority level set for all neighbors configured for a routing protocol session (e.g., BGP session). In this way, network device 40 may be configured to prioritize an establishment of routing protocol sessions to reduce or eliminate dropped traffic when a failed gateway of network device 40 comes back online.

In some examples, a system administrator 66 (also referred to as "ADMIN 66") may provide configuration information to network device 40 via user interface (UI) 64 (e.g., a command line interface) included within control unit 42. For example, the system administrator may configure network device 40 or install software to extend BGP 48C as described herein. As another example, system administrator 66 may configure RSVP-TE 48A to traffic-engineer an MP-LSP from an ingress router to an egress router.

UI 64 may be configured as a management interface for accepting input of one or more threshold values and/or information. For example, UI 64 may be configured to provide a management interface that may receive a threshold number (e.g., 'N') of established routing protocol sessions. In some examples, UI 64 may be configured to provide a management interface that may receive a threshold timer value. In some examples, UI 64 may be configured provide a management interface that may receive a threshold number ('T') of finished route exchanges. In some examples, UI 64 may be configured to provide a management interface that may receive peer priority information 52. In some examples, network device 40 may include an additional or alternative management interface by which network device 40 is configured with the threshold values and/or other configuration information. For example, network device may be configured by a software agent, a Software-Defined Network (SDN) controller, or other external configuration entity.

The architecture of network device 40 illustrated in FIG. 2 is shown for exemplary purposes only. The techniques of this disclosure are not limited to this architecture. In other examples, network device 40 may be configured differently. In one example, some of the functionally of control unit 42 may be distributed within IFCs 54. In some examples, control unit 42 may include a routing engine that performs routing functions and maintains RIB 50, and a forwarding engine that performs packet forwarding based on a forwarding information base (FIB), generated in accordance with the RIB 50.

Control unit 42 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 42 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Figure 3:
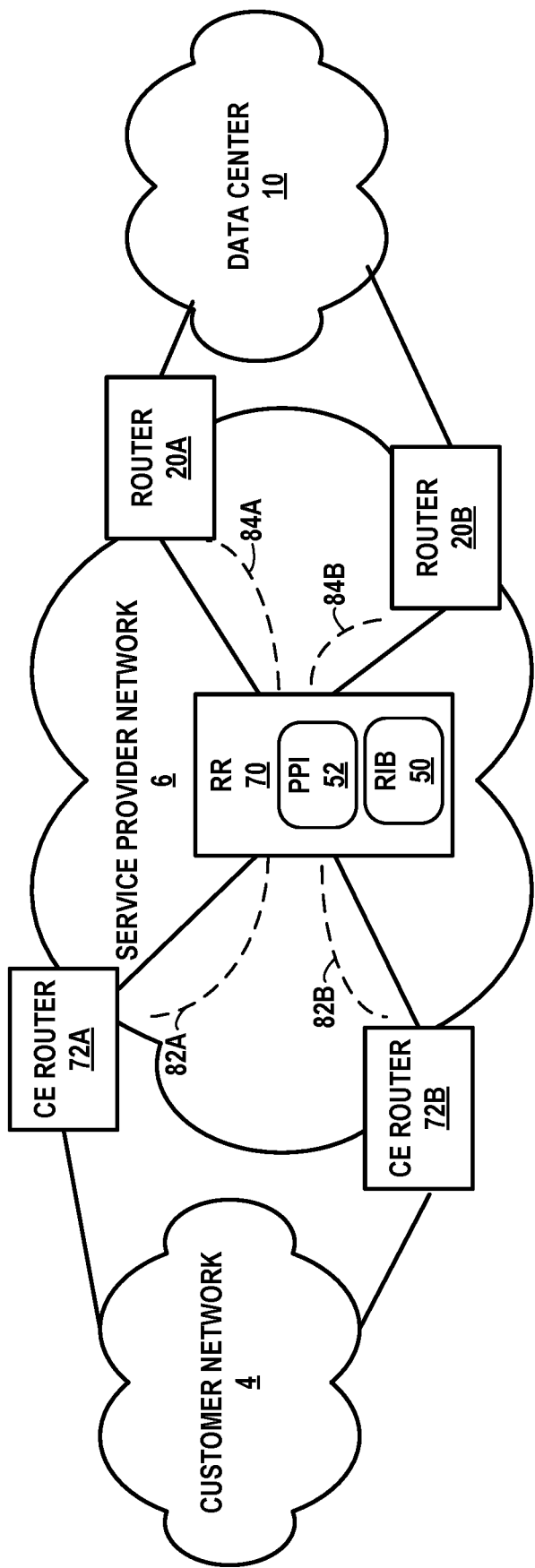
FIG. 3 is a block diagram illustrating an example implementation of a service provider network of FIG. 1 in further detail.

FIG. 3 is a block diagram illustrating an example implementation of service provider network 6 of FIG. 1 in further detail. Route reflector 70 may be configured to advertise routes to one or more internal peer network devices. As used herein, an internal peer network device may refer to a peer network device that is within a cluster of peer devices. For example, route reflector 70 may advertise routes to CE routers 72A and 72B and routers 20A and 20B when CE routers 72A and 72B, routers 20A and 20B, and route reflector 70 correspond to a common cluster.

As shown, service provider network 6 may include a route reflector 70, and customer edge (CE) routers 72A and 72B. In the example of FIG. 3, route reflector 70 may work to establish routing protocol session 82A with customer edge router 72A, routing protocol session 82B with customer edge router 72B, routing protocol session 84A with router 20A, and routing protocol session 84B with router 20B.

Route reflector 70 may be configured to select a prioritized sub-set of routing protocol sessions based on peer priority information 52. For example, route reflector 70 may arrange all neighbors or peer network devices with different priorities into two priority levels: a high priority level and a low priority level. For instance, route reflector 70 may determine that peer priority information 52 indicates that routing protocol sessions 82A and 82B of RIB 50 are high priority level and that routing protocol sessions 84A and 84B are low priority level.

Route reflector 70 may establish one or more routing protocol sessions of the prioritized sub-set. For example, when a routing protocol process (e.g., BGP protocol process) is started, route reflector 70 may begin to establish routing protocol sessions corresponding to the high priority level and may defer processing routing protocol sessions corresponding to the low priority level. More specifically, for instance, route reflector 70 may output an open routing protocol message (e.g., BGP open message) to each of CE routers 72A and 72B for establishing routing protocol sessions 82A and 82B and refrain from outputting open routing protocol message to routers 20A and 20B for establishing routing protocol session 84A and 84B.

In response to determining that a threshold for establishing the prioritized sub-set of routing protocol sessions is not satisfied, route reflector 70 may refrain from establishing routing protocol sessions corresponding to the low priority level. For example, route reflector 70 may continue to establish routing protocol sessions corresponding to the high priority level and may defer processing routing protocol sessions corresponding to the low priority level until one or more of the following. For instance, route reflector 70 may work to establish routing protocol sessions 82A and 82B before initiating an establishment of routing protocol sessions 84A and 84B.

Route reflector 70 may process routing protocol sessions corresponding to the low priority level when a configurable number (e.g., 'N') of routing protocol sessions corresponding to the high priority level have been established. Additionally, or alternatively, route reflector 70 may process routing protocol sessions corresponding to the low priority level when a configurable number (e.g., 'T') of routing protocol sessions corresponding to the high priority level have finished route exchanges. Additionally, or alternatively, route reflector 70 may process routing protocol sessions corresponding to the low priority level when a configurable timer expires post 'N' sessions of routing protocol sessions corresponding to the high priority level have been established.

In some examples, if none or less than 'N' number of the sessions corresponding to the high priority level have been established, route reflector 70 may refrain from processing the routing protocol sessions corresponding to the low priority level. However, in some examples route reflector 70 may be configured to override refraining from processing the routing protocol sessions corresponding to the low priority level. For instance, if none or less than 'N' number of the sessions corresponding to the high priority level have been established, when route reflector has been configured to process low priority level routing protocol sessions even when no high priority level routing protocol sessions have been established, route reflector 70 may at some point begin processing the routing protocol sessions corresponding to the low priority level. For example, in response to determining that a threshold for establishing the prioritized sub-set of routing protocol sessions is satisfied (e.g., satisfies threshold 'T', threshold 'N', a timer, or another threshold, in this configuration mode route reflector 70 may establish routing protocol sessions corresponding to the low priority level.

Route reflector 70 may forward network traffic using the established routing protocol sessions. For example, router 20A may output traffic from data center 10 to customer networks 4 using a route advertised by router 20A. Although the above example lists two priority levels, (e.g., a high priority level and a low priority level), gateway devices 8 may be configured to use more than two levels, for instance, but not limited to, a high priority level, a medium priority level, and a low priority level, or other priority levels.

Figure 4:
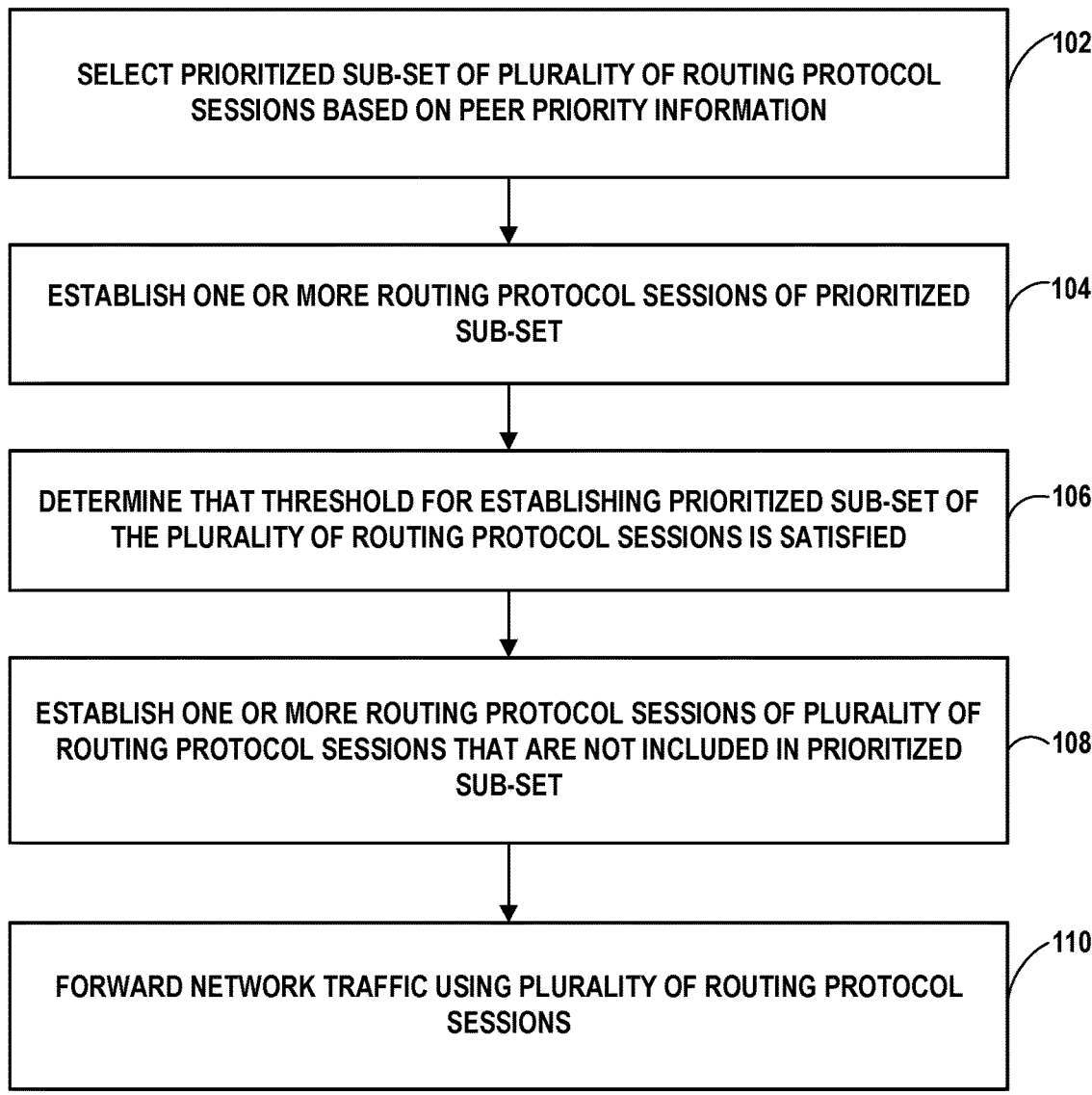
FIG. 4 is a flowchart illustrating an example operation of network devices in accordance with the techniques of this disclosure.

FIG. 4 is a flowchart illustrating an example operation of network devices in accordance with the techniques of this disclosure. FIG. 4 is discussed with respect to FIGS. 1-3 for exemplary purposes only.

Network device 40 selects a prioritized sub-set of plurality of routing protocol sessions based on peer priority information (102). For example, gateway device 8A may select a prioritized sub-set of routing protocol sessions of RIB 50A that are indicated by peer priority information 52A as corresponding to a relatively high priority level. In some examples, route reflector 70 may select a prioritized sub-set of routing protocol sessions of RIB 50 that are indicated by peer priority information 52 as corresponding to a relatively high priority level. Network device 40 establishes the one or more routing protocol sessions of the prioritized sub-set (104). For example, gateway device 8A may establish routing protocol sessions 12A-12L. In some examples, route reflector 70 may establish routing protocol sessions 82A, 82B.

Network device 40 determines that a threshold for establishing the prioritized sub-set of the plurality of routing protocol sessions is satisfied (106). For example, gateway device 8A may determine that the threshold for establishing the prioritized sub-set of the plurality of routing protocol sessions is satisfied when the number of established routing protocol sessions of the prioritized sub-set exceeds the threshold number of established routing protocol sessions (e.g., 'N'). In some examples, gateway device 8A may determine that the threshold for establishing the prioritized sub-set of the plurality of routing protocol sessions is satisfied when a number of finished route exchanges for routing protocol sessions of the prioritized sub-set exceeds a threshold number of finished route exchanges (e.g., 'T'). In some examples, route reflector 70 may determine that the threshold for establishing the prioritized sub-set of the plurality of routing protocol sessions is satisfied when the number of established routing protocol sessions of the prioritized sub-set exceeds the threshold number of established routing protocol sessions (e.g., 'N'). In some examples, route reflector 70 may determine that the threshold for establishing the prioritized sub-set of the plurality of routing protocol sessions is satisfied when a number of finished route exchanges for routing protocol sessions of the prioritized sub-set exceeds a threshold number of finished route exchanges (e.g., 'T').

Network device 40 establishes the one or more routing protocol sessions of the plurality of routing protocol sessions that are not included in the prioritized sub-set (108). For example, gateway device 8A may establish routing protocol sessions 14A-14N. In some examples, route reflector 70 may establish routing protocol sessions 84A, 84B. Network device 40 forwards network traffic using the plurality of routing protocol sessions (110). For example, gateway device 8A may receive network traffic from TOR switches 24A-24N via routing protocol sessions 14A-14N and forward the network traffic to routers 20A-20L via routing protocol sessions 12A-12L. In some examples, route reflector 70 may receive network traffic from routers 20A, 20B via routing protocol sessions 84A, 84B and forward the network traffic to CE routers 72A, 72B via routing protocol sessions 82A, 82B.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, process or components may be implemented together or separately as discrete but interoperable logic devices. Depiction of different features as process or units is intended to highlight different functional aspects and does not necessarily imply that such process or units must be realized by separate hardware or software components. Rather, functionality associated with one or more process or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various aspects of this disclosure have been described. These and other aspects are within the scope of the following claims.

What is claimed is:

1. A method comprising:
selecting, by a network device, a prioritized sub-set of a plurality of routing protocol sessions based on peer priority information, each routing protocol session of the plurality of routing protocol sessions corresponding to a session with a respective peer network device of a plurality of peer network devices, wherein the peer priority information indicates a priority level of the routing protocol session;
establishing, by the network device, one or more routing protocol sessions of the prioritized sub-set, wherein establishing the one or more routing protocol sessions of the prioritized sub-set comprises refraining from establishing one or more routing protocol sessions of the plurality of routing protocol sessions that are not included in the prioritized sub-set;
initiating, by the network device, a timer based on a number of established routing protocol sessions of the prioritized sub-set;
establishing, by the network device, one or more routing protocol sessions of the plurality of routing protocol sessions that are not included in the prioritized sub-set when the timer exceeds a threshold timer value; and
forwarding, by the network device, network traffic using the established one or more routing protocol sessions of the prioritized sub-set and the established one or more routing protocol sessions of the plurality of routing protocol sessions that are not included in the prioritized sub-set.

2. The method of claim 1, further comprising:
determining, by the network device, whether the number of established routing protocol sessions of the prioritized sub-set exceeds a threshold number of established routing protocol sessions;
wherein initiating the timer is in response to determining that the number of established routing protocol sessions of the prioritized sub-set exceeds the threshold number of established routing protocol session.

3. The method of claim 2, further comprising receiving, by the network device, configuration information defining the threshold number of established routing protocol sessions via a management interface.

4. The method of claim 1, further comprising receiving, by the network device, configuration information defining the threshold timer value via a management interface of the network device.

5. The method of claim 1,
wherein the peer priority information indicates a high priority level of a routing protocol session between the network device and a network device reachable via a wide-area network (WAN);
wherein the peer priority information indicates a low priority level of a routing protocol session between the network device and a top-of-rack (TOR) switch; and
wherein selecting the prioritized sub-set of a plurality of routing protocol sessions comprises selecting each routing protocol session for network devices reachable via the WAN from the plurality of routing protocol sessions as being included in the prioritized sub-set and refraining from including each routing protocol session for the TOR switch in the prioritized sub-set.

6. The method of claim 1, wherein the plurality of routing protocol sessions comprises a plurality of border gateway protocol (BGP) sessions.

7. The method of claim 1, further comprising receiving, by the network device and prior to selecting the prioritized subset, configuration information defining the peer priority information via a management interface of the network device.

8. A network device comprising one or more processors implemented in circuitry, the one or more processors being configured to:
select a prioritized sub-set of a plurality of routing protocol sessions based on peer priority information, each routing protocol session of the plurality of routing protocol sessions corresponding to a session with a respective peer network device of a plurality of peer network devices, wherein the peer priority information indicates a priority level of the routing protocol session;
establish one or more routing protocol sessions of the prioritized sub-set, wherein, to establish the one or more routing protocol sessions of the prioritized sub-set, the one or more processors are configured to refrain from establishing one or more routing protocol sessions of the plurality of routing protocol sessions that are not included in the prioritized sub-set;
initiate a timer based on a number of established routing protocol sessions of the prioritized sub-set;
establish one or more routing protocol sessions of the plurality of routing protocol sessions that are not included in the prioritized sub-set when the timer exceeds a threshold timer value; and
forward network traffic using the established one or more routing protocol sessions of the prioritized sub-set and the established one or more routing protocol sessions of the plurality of routing protocol sessions that are not included in the prioritized sub-set.

9. The network device of claim 8, wherein the one or more processors are further configured to:
determine whether the number of established routing protocol sessions of the prioritized sub-set exceeds a threshold number of established routing protocol sessions; and
wherein the one or more processors are configured to initiate the timer in response to determining that the number of established routing protocol sessions of the prioritized sub-set exceeds the threshold number of established routing protocol session.

10. The network device of claim 9, wherein the one or more processors are further configured to receive configuration information defining the threshold number of established routing protocol sessions via a management interface.

11. The network device of claim 8, wherein the one or more processors are further configured to receive configuration information defining the threshold timer value via a management interface.

12. The network device of claim 8, wherein the network device is a gateway device that provides access to a data center.

13. The network device of claim 8, wherein the network device is a route reflector that advertises routes to one or more internal peer network devices.

14. The network device of claim 8,
wherein the peer priority information indicates a high priority level of a routing protocol session between the network device and a network device reachable via a wide-area network (WAN);

wherein the peer priority information indicates a low priority level of a routing protocol session between the network device and a top-of-rack (TOR) switch; and wherein, to select the prioritized sub-set of a plurality of routing protocol sessions, the one or more processors are configured to select each routing protocol session for network devices reachable via the WAN from the plurality of routing protocol sessions as being included in the prioritized sub-set and refrain from including each routing protocol session for the TOR switch in the prioritized sub-set.

15. The network device of claim 8, wherein the plurality of routing protocol sessions comprises a plurality of border gateway protocol (BGP) sessions.

16. A non-transitory computer-readable storage medium comprises instructions for causing a programmable processor to:

select a prioritized sub-set of a plurality of routing protocol sessions based on peer priority information, each routing protocol session of the plurality of routing protocol sessions corresponding to a session with a respective peer network device of a plurality of peer network devices, wherein the peer priority information indicates a priority level of the routing protocol session;

establish one or more routing protocol sessions of the prioritized sub-set, wherein, to establish the one or more routing protocol sessions of the prioritized sub-set, the instructions cause the programmable processor to refrain from establishing one or more routing protocol sessions of the plurality of routing protocol sessions that are not included in the prioritized sub-set;

initiate a timer based on a number of established routing protocol sessions of the prioritized sub-set;

establish one or more routing protocol sessions of the plurality of routing protocol sessions that are not included in the prioritized sub-set when the timer time exceeds a threshold timer value; and forward network traffic using the established one or more routing protocol sessions of the prioritized sub-set and the established one or more routing protocol sessions of the plurality of routing protocol sessions that are not included in the prioritized sub-set.

17. The non-transitory computer-readable storage medium of claim 16, wherein the instructions further cause the programmable processor to determine whether the number of established routing protocol sessions of the prioritized sub-set exceeds a threshold number of established routing protocol sessions; and wherein the instructions further cause the programmable processor to initiate the timer in response to determining that the number of established routing protocol sessions of the prioritized sub-set exceeds the threshold number of established routing protocol session.

18. The non-transitory computer-readable storage medium of claim 17, wherein the instructions further cause the programmable processor to receive configuration information defining the threshold number of established routing protocol sessions via a management interface.

19. The non-transitory computer-readable storage medium of claim 16 wherein the instructions further cause the programmable processor to receive configuration information defining the threshold timer value via a management interface.

20. The non-transitory computer-readable storage medium of claim 16, wherein the peer priority information indicates a high priority level of a routing protocol session between the network device and a network device reachable via a wide-area network (WAN);

wherein the peer priority information indicates a low priority level of a routing protocol session between the network device and a top-of-rack (TOR) switch; and wherein, to select the prioritized sub-set of a plurality of routing protocol sessions, the instructions cause the programmable processor to select each routing protocol session for network devices reachable via the WAN from the plurality of routing protocol sessions as being included in the prioritized sub-set and refrain from including each routing protocol session for the TOR switch in the prioritized sub-set.

* * * * *